United States Patent
Cookingham et al.

[19]

[11] Patent Number: 5,983,827
[45] Date of Patent: Nov. 16, 1999

[54] TIP TO TAIL ILLUMINATED POINTER ASSEMBLY

[75] Inventors: Gerald Timothy Cookingham, Flushing; Martina L. Cliffel, Pontiac; Coley R. Gordon, Flushing, all of Mich.

[73] Assignee: Delco Electronics Corporation, Kokomo, Ind.

[21] Appl. No.: 08/851,633

[22] Filed: May 6, 1997

[51] Int. Cl.⁶ .................................................. G01D 11/28
[52] U.S. Cl. .............................. 116/288; 116/332; 362/26
[58] Field of Search ........................ 116/286–288, 28 R, 116/284, 303, 319, 327, 328, 329, 332, 300, 305, 320, DIG. 5, DIG. 6, DIG. 26, DIG. 36; 362/26, 27, 28, 30, 23; 340/815.42

[56] References Cited

U.S. PATENT DOCUMENTS

| | | | |
|---|---|---|---|
| 4,274,358 | 6/1981 | Nakamura et al. | 116/288 |
| 4,860,170 | 8/1989 | Sakakibara et al. | 116/288 |
| 5,458,082 | 10/1995 | Cookingham | 116/288 |

FOREIGN PATENT DOCUMENTS

| | | | |
|---|---|---|---|
| 295165 | 12/1988 | European Pat. Off. | 116/288 |
| 411799 | 2/1991 | European Pat. Off. | 116/28 R |
| 2687470 | 8/1993 | France | 116/288 |
| 3347014 | 7/1985 | Germany | 116/288 |
| 4215150 | 11/1993 | Germany | 116/288 |
| 4-113226 | 4/1992 | Japan | 116/286 |

*Primary Examiner*—Andrew Hirshfeld
*Attorney, Agent, or Firm*—Jimmy L. Funke

[57] ABSTRACT

A pointer assembly illuminated by a rear circular light source surrounding a pointer axis includes a pointer having an inner portion surrounding the axis and a tip extending radially from the inner portion, a stem for supporting the pointer on a gauge spindle and including a plate for attenuating light transmission to the inner portion, and a cap surrounding the inner portion to prevent unwanted light escape from the assembly and having an elongated opening aligned with the tip. The tip and elongated opening define the illuminated pointer surface. A light collector portion of the tip located near the axis has a curved reflector for uniformly disseminating received light along the length of the tip.

3 Claims, 2 Drawing Sheets

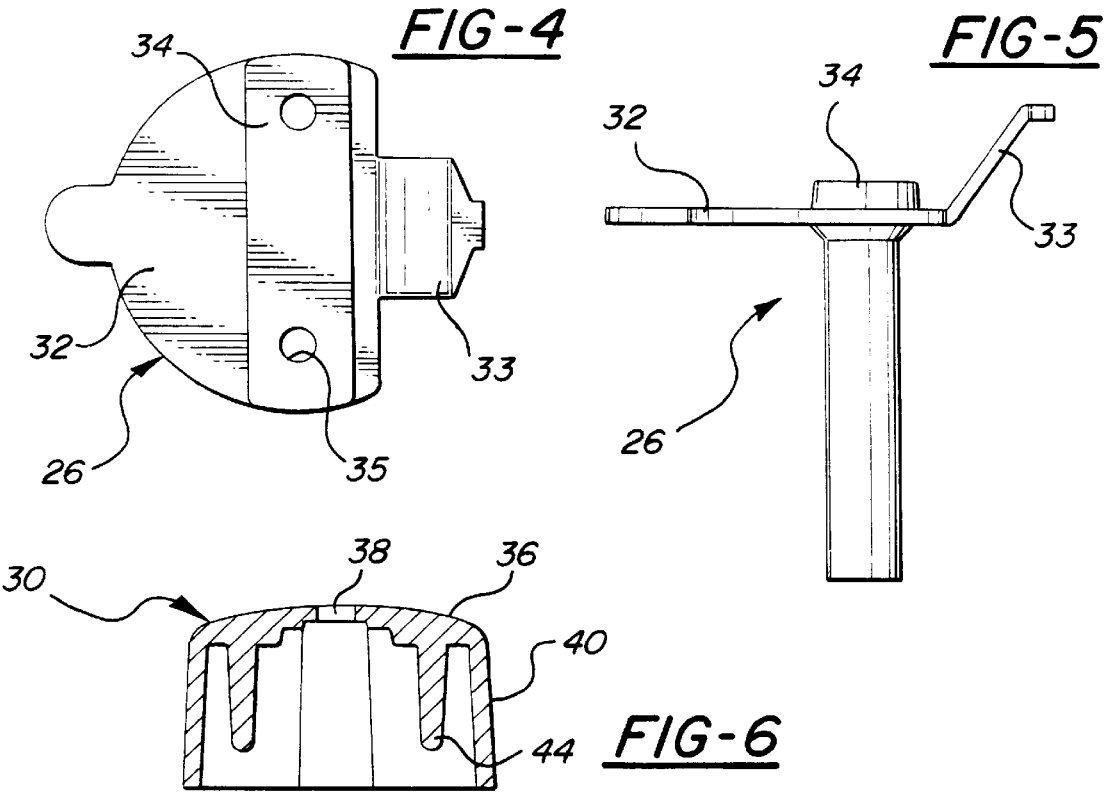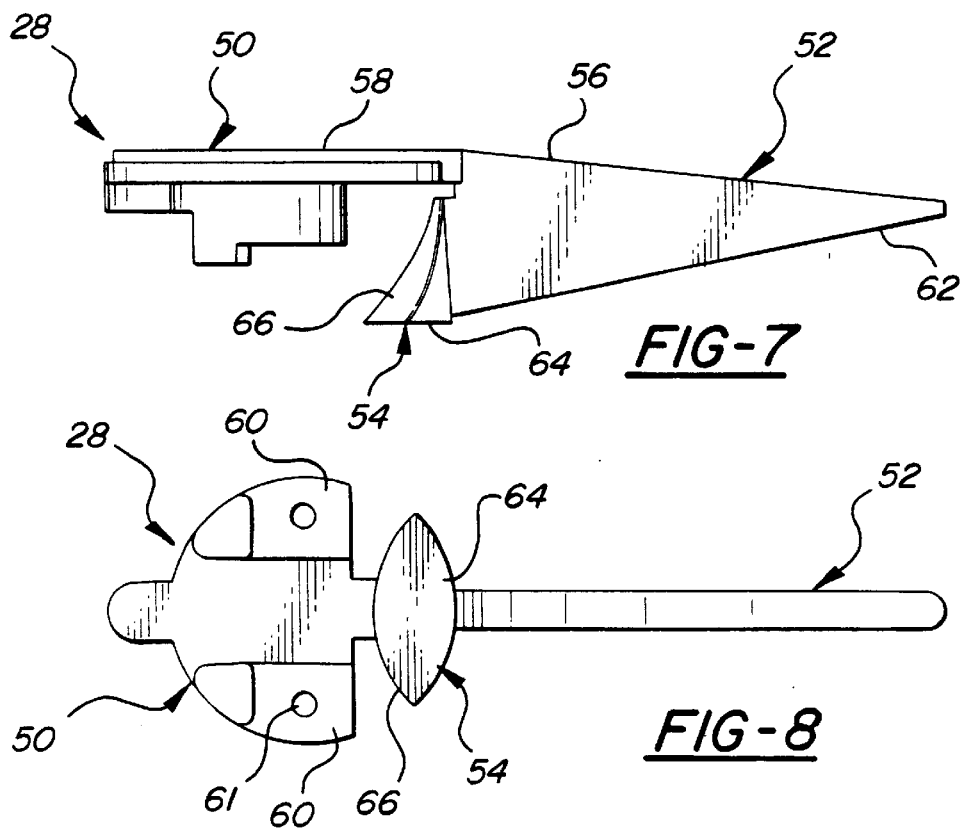

5,983,827

TIP TO TAIL ILLUMINATED POINTER ASSEMBLY

FIELD OF THE INVENTION

This invention relates to illuminated instrument displays and particularly to instrument pointers which extend in both directions from an axis of rotation and are illuminated throughout their whole length.

BACKGROUND OF THE INVENTION

Instrument gauges used for displaying information in motor vehicles generally employ pointers which are illuminated at least at night for easy viewing. While pointer styles vary for aesthetic reasons as well as for functional viewing reasons to suit different situations, pointers usually have been illuminated from the tip to some point short of the spindle axis. It is desirable in some applications to have a longer illuminated portion of the pointer and especially including a tail portion which extends beyond the spindle axis opposite from the pointer tip.

Such tip to tail illuminated pointers have been achieved using an expensive construction and yet have resulted in non-uniform illumination along the length of the pointer. The U.S. Pat. No. 5,458,082 entitled "TIP TO TAIL ILLUMINATED POINTER" discloses an illuminated pointer which is inexpensive and extends across the spindle axis. That pointer achieved illumination from the tip to the tail by using an illuminated filter in the region of the axis and, along with an apertured cap, forming an extended pointer tail. The edge of the filter is visible, however, causing a discontinuity in pointer appearance.

SUMMARY OF THE INVENTION

It is therefore an object of the invention to uniformly and continuously illuminate an instrument pointer extending across the axis of rotation of the pointer.

A pointer assembly comprises a transparent pointer having an inner portion extending around the pointer axis and a tip portion extending to one side, a cap surrounding the inner portion and having an elongated front opening extending across the axis to define a pointer window in line with and a visual continuation of the tip portion so that when illuminated the pointer extends from the tip on one side of the axis to a tail on the other side of the axis. The pointer assembly also includes a stem for attachment to a drive spindle, the stem having a front plate extending generally radially of the axis to support the inner portion. The tip portion is a thin triangular element flaring out from the tip toward the axis. A light collecting portion on the triangular element near the axis extends to either side of the element to collect light from a source and reflect it to the front face of the tip portion for uniform illumination. A curved reflecting surface on the light controlling portion determines the light distribution to the front face of the tip portion.

A light pipe surrounding the axis behind the pointer directs light axially to the pointer. Some of the light is collected by the light controlling element to illuminate the tip and the remainder is directed through the front plate of the stem to the inner portion of the pointer. The stem material has a limited transmissivity to reduce the level of illumination through the window of the cap to match that of the tip. The material transmissivity and the thickness of the front plate are chosen to attain the desired amount of light transmission to the inner portion.

BRIEF DESCRIPTION OF THE DRAWINGS

The above and other advantages of the invention will become more apparent from the following description taken in conjunction with the accompanying drawings wherein like references refer to like parts and wherein:

FIGS. 4 and 5 are front and side views, respectively, of the stem of the pointer assembly of FIG. 1;

FIG. 6 is a cross section of the cap of the pointer assembly of FIG. 1; and

FIGS. 7 and 8 are side and rear views, respectively of the pointer of the pointer assembly of FIG. 1.

DESCRIPTION OF THE INVENTION

Figure 1:
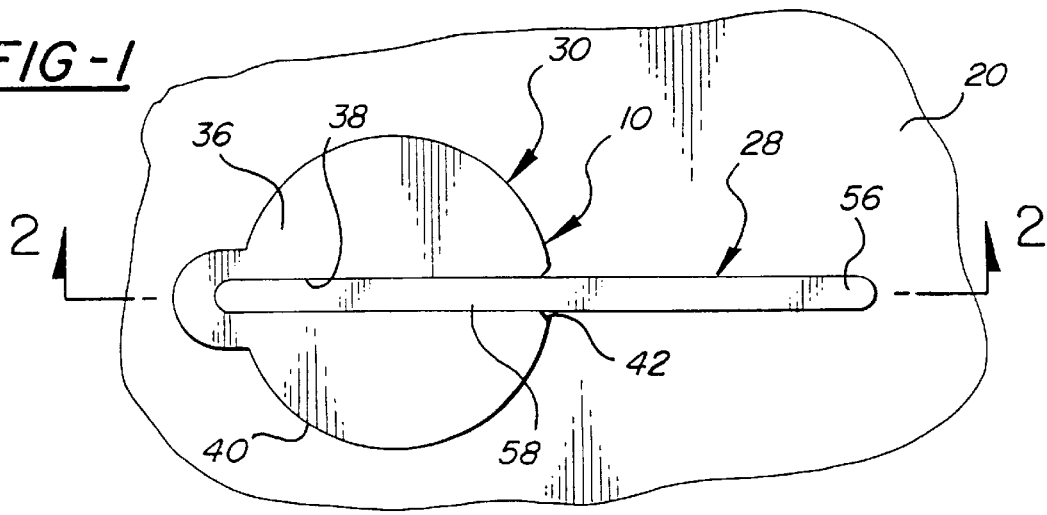
FIG. 1 is a front view of a pointer assembly according to the invention, installed in a display.
Figure 2:
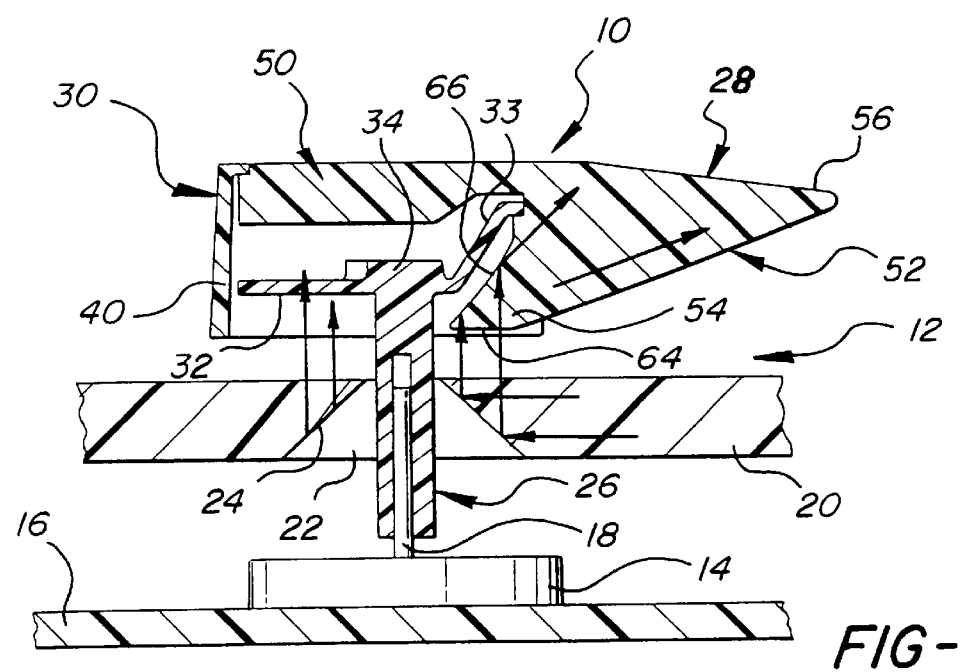
FIG. 2 is a cross section of the pointer assembly and display of FIG. 1 taken along line 2—2.

An illuminated pointer assembly 10 for an automotive instrument display 12 is shown in FIGS. 1 and 2. The display includes a motor 14 supported on a circuit board 16 and driving a spindle 18 on a pointer axis. A light pipe 20 in front of the motor 14 has an opening 22 with a beveled edge 24 to reflect light in the light pipe in the forward direction 360° around the axis. While the light direction is nominally parallel to the axis, it is expected that there will be some portion of the light traveling in other directions. An appliqué on the front of the light pipe or a separate face plate, not shown, may be used to limit light emission to the region of the opening 22 as well as providing gauge indicia.

Figure 3:
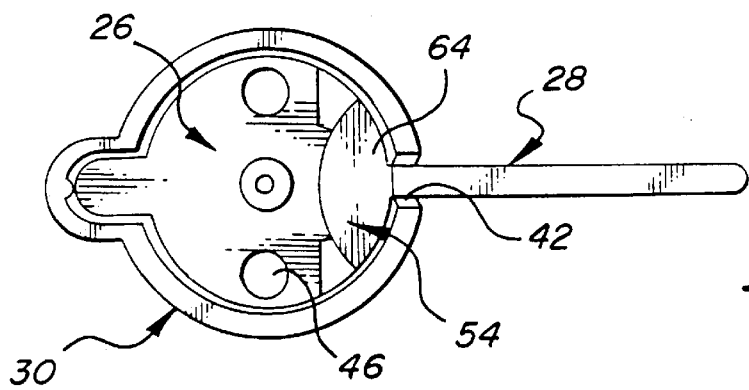
FIG. 3 is a rear view of pointer assembly of FIG. 1.

The pointer assembly 10 comprises three parts including a stem 26, a pointer 28 and a cap 30. The stem extends through the light pipe opening 22 and has a bore to mount on the spindle 18. The stem, further shown in FIGS. 3–5, also has a radially extending front plate 32 including a forwardly canted tab 33 for engaging the pointer 28 and a transverse raised portion 34 for engaging a rear surface of the pointer. A pair of mounting holes 35 extend through the raised portion.

The cap 30, shown in section in FIG. 6, has a front wall 36 with an elongated opening 38, a side wall 40 surrounding the stem 26 and having an elongated opening 42 aligned with the opening 38, and two pins 44 depending from the front wall. The pins 44 pass through the mounting holes 35 in the stem plate 32 and corresponding openings in the pointer and are upset or heat staked as shown at reference 46 in FIG. 3 to hold the three parts together. The cap is molded of opaque material or decorated with an opaque coating to prevent light escape from the cap except within the pointer 28 itself. The inside of the cap should have a white or reflective surface to foster reflection of stray light into the pointer.

The pointer 28 has an inner portion 50 which resides within the cap 30 and a tip 52 extending from the inner portion 50 and residing mainly outside the cap, but a light collector 54 on the tip and near the axis is within the cap. The pointer, also shown in FIGS. 7 and 8, is molded of transparent material for efficiently transferring incoming light from the light pipe to a front face 56 of the tip and to a front strip 58 on the inner portion. The inner portion 50 is a truncated disc peripherally conforming to the cap 30 and having a raised front strip 58 fitting within the elongated opening 38 of the cap. Rear bosses 60 spaced on either side of the strip 58 contain mounting holes 61 to receive the pins 44 and have stepped rear surfaces to seat on the stem plate 32 and raised portion 34.

The pointer tip 52 comprises a thin triangular element bounded by the front face 56, a rear face 62 and the light collector 54 and having a thickness equal the width of the front strip 58. The front strip 58 and the front face 56 together comprise the visible illuminated front of the pointer. The specific pointer geometry will depend on the particular application. In the specific example illustrated in the drawings the front face lies at a small angle of about 6° behind the front plane of the strip 58 and the rear face 62 is disposed at an acute angle of about 29° to the front face to optimize the emission of light from the front face and to allow room for the light collector.

The light collector 54 has a rear light receiving surface 64 normal to the axis and, as viewed in the cross section of FIG. 2 and the side view of FIG. 7, has a concave reflecting surface 66 just forward of the receiving surface 64 shaped to direct light uniformly to various locations along the tip. Assuming that the light is transmitted to the pointer in the axial direction, each incremental area of the reflecting surface will reflect light to a particular region of the front face 56. As indicated by the arrows, light rays impinging on the rear-most part of the curved surface 66 will be reflected to the distal end of the tip and rays impinging on more forward regions will be reflected to areas progressively closer to the axis. The light collector extends laterally to both sides of the triangular element to collect light from a substantial angular extent of the circular light emitting region of the light pipe 20. As viewed in a plane normal to the axis, as shown in FIG. 8, the reflecting surface is convex so that light received laterally of the tip will be directed inward toward the tip.

The inner portion 50 of the pointer is illuminated partially by light received directly from the light pipe 20 and partially by light leakage through the reflecting surface 66. In either case the light passes through the plate 32, including the tab 33, before reaching the front strip 58 of the inner portion. The transmissivity of the stem material and the plate thickness are selected to attenuate the brightness of the inner portion to match that of the tip, thereby achieving uniformity of illumination. A polyacetal material is suitable for this purpose.

Depending on the application, the balance of brightness can also be controlled by the design of the light pipe 20 and the placement of lamps supplying the light pipe. For example, if the pointer range is less than 180° the segment of the opening 22 emitting light over the range of the tip may be more brightly illuminated than the segment which chiefly supplies the inner portion, ensuring that there is sufficient light for the tip brightness to match the inner portion brightness.

The front surfaces of the tip 52 and the strip 58 are hot stamped or otherwise coated with a white film or other color according to the desired pointer appearance. Similarly the rear surface 62 of the tip is coated to enhance reflection of stray light to the front face 56, although very little light from the reflecting surface 66 reaches the rear surface.

The improved pointer assembly uses only three parts, pointer, cap and stem to achieve uniform and continuous pointer illumination from the tip and extending across the pointer axis to a tail. A light collecting structure for uniformly disseminating light to the tip portion of the pointer and a stem plate for controlling the light transmission to the inner portion of the pointer combine to achieve a seamless lineal light display.

The embodiments of the invention in which an exclusive property or privilege is claimed are defined as follows:

1. An illuminated instrument display comprising:
    a spindle having an axis of rotation;
    a light source surrounding the spindle;
    a pointer assembly including a light attenuating stem attached to the spindle above said light source and having a plate extending radially from said axis of rotation, a translucent pointer fixed with respect to said spindle, having an elongated front face for emitting light from the light source, said pointer including a central portion above said plate, a tip portion extending radially from said central portion beyond said plate, and a light gathering portion extending from the tip portion, said plate of said light attenuating stem having a support section angled upward toward the central portion to support said pointer, said light gathering portion being at least partially disposed between said light source and said support section of said plate; and
    an opaque cap surrounding said plate and the light gathering portion of said pointer, and having an elongated opening registered with the central portion of said pointer.

2. The illuminated instrument display of claim 1 wherein the opaque cap includes:
    molded pins extending through corresponding openings in the pointer and plate, said pins being heat staked for mutually securing together the pointer, the stem and the cap.

3. The illuminated instrument display of claim 1 wherein the light source extends in a circle around the spindle and wherein:
    the light gathering portion of said pointer extends laterally on each side of the tip portion to collect light emitted through an angular extent of the light source.

* * * * *